July 12, 1960 V. J. SCOTT ET AL 2,945,090

NOISE INVERTER CIRCUIT

Filed May 29, 1957

INVENTORS.
VICTOR J. SCOTT.
JAMES C. DAPPER.
BY Alden D. Redfield
Irwin P. Garfinkle
ATTORNEYS.

United States Patent Office
2,945,090
Patented July 12, 1960

2,945,090

NOISE INVERTER CIRCUIT

Victor J. Scott and James C. Dapper, Cincinnati, Ohio, assignors to Avco Manufacturing Corporation, Cincinnati, Ohio, a corporation of Delaware Filed May 29, 1957, Ser. No. 662,482

3 Claims. (Cl. 178—7.3)

Figures 1, 2:
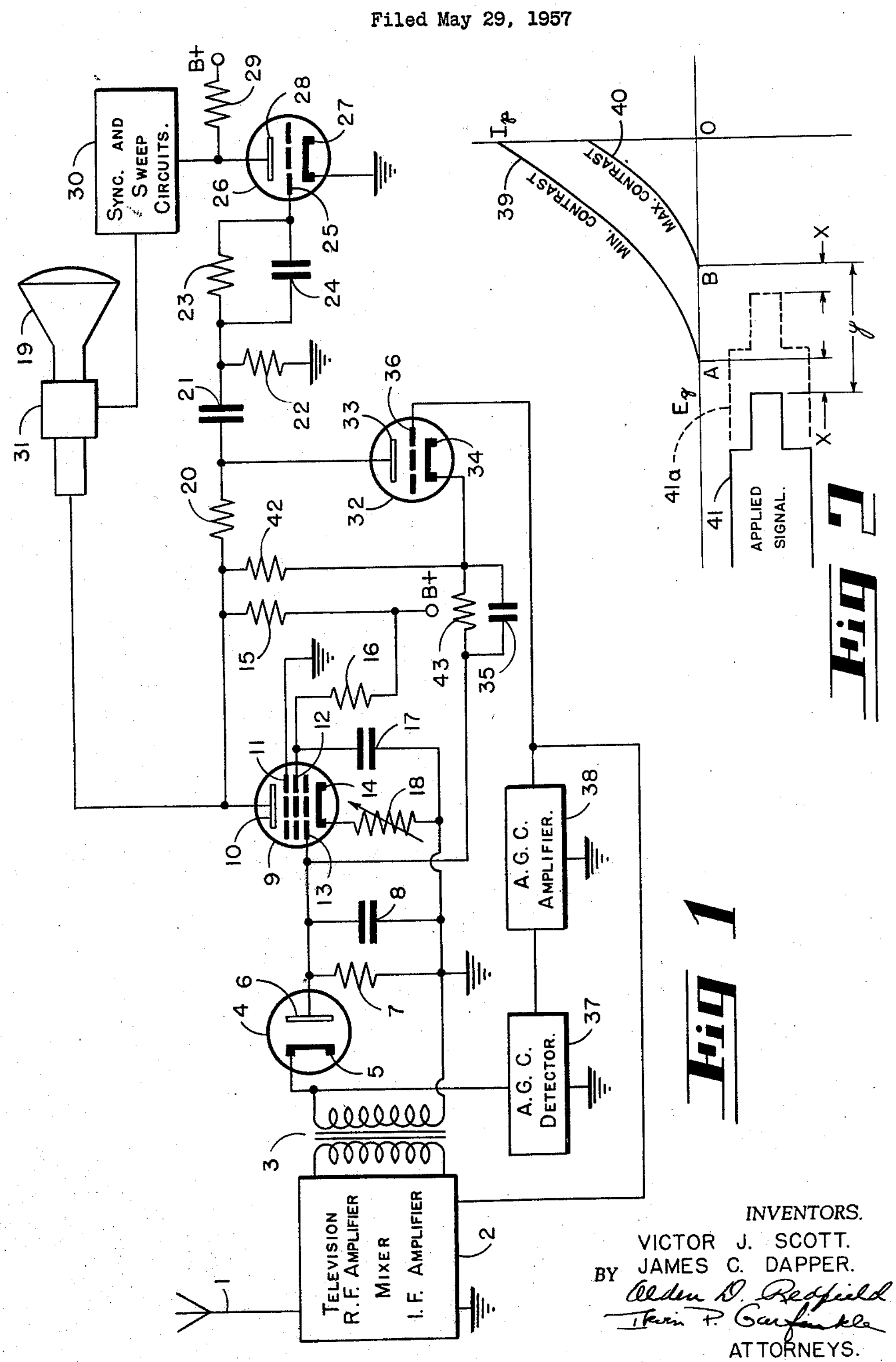

This invention relates to a noise immunity circuit for television receivers and, more particularly, to an improved noise inverter circuit for preventing noise from interfering with the operation of the synchronizing circuits in a television receiver at all levels of contrast control.

In the television art, the transmitted carrier frequency is modulated by a composite television signal having a synchronizing pulse. In addition, the carrier is also modulated by undesirable noise generated in the atmosphere and in certain portions of the transmitting and receiving apparatus. Many more or less effective systems for eliminating noise have been employed. One type of noise elimination circuit is described in United States Patent No. 2,718,552 issued to E. I. Anderson on September 20, 1955.

The Anderson circuit provides noise immunity in a television receiver by inserting a noise inverter triode between the input and output circuits of the video amplifier. Demodulated television signals are applied to the noise inverter triode by means of a connection from the output of the video detector to the cathode of the triode. The control grid of the noise inverter triode is biased so that conduction will occur only when a noise pulse whose amplitude extends beyond the amplitude level of the synchronizing pulse is present at its cathode. When conduction does occur, the noise inverter triode produces an inverted noise pulse which reverses the polarity of or cancels the noise pulse which would otherwise be present at the output of the video amplifier.

Investigation of the Anderson circuit reveals that the operation of the noise inverter triode is satisfactory for only one given setting of the contrast control, and that as the contrast control on the video amplifier is varied, improper operation of the noise inverter circuit results.

It is the primary object of this invention to develop a bias voltage on the noise inverter stage which will be proportional to the contrast control setting of a television receiver at all levels of operation.

Another object of this invention is to maintain operation of a noise inverter at a constant level with respect to the applied signal.

Another object of this invention is to provide a noise inverter circuit in which a direct current voltage from the output circuit of the video amplifier is supplied to the cathode of the noise inverter triode so as to cause the bias on the noise inverter to follow any given gain setting of the contrast control of the video amplifier.

For a more complete understanding of the nature and further objects of this invention, reference should now be made to the following description and to the accompanying drawing in which:

Fig. 1 is a circuit, partly in block diagram form, showing a complete television receiver embodying the improved noise inverter circuit; and Fig. 2 comprises curves illustrating the operation of the noise inverter circuit.

Referring to Fig. 1 of the drawings, there is shown a complete television receiver having an antenna 1 and a receiver section 2 comprising conventional television receiver components, including a radio frequency amplifier, mixer and intermediate frequency amplifier. The intermediate frequency output from the receiver section 2 is applied through an intermediate frequency transformer 3 to a diode video detector 4 having a cathode 5 and a plate 6. The output of the diode detector 4 is filtered by means of resistor 7 and condenser 8 and is applied to the input circuit of pentode video amplifier 9 having a plate 10, a grounded suppressor grid 11, a screen grid 12, a control grid 13 and a cathode 14. The plate 10 is coupled to the B+ supply through a supply resistor 15, while the screen grid 11 is connected to the B+ supply through a resistor 16. A bypass condenser 17 is provided in a conventional manner between the screen grid 12 and ground. A variable contrast control resistor 18 in the cathode circuit is employed for the purpose of varying the intensity (the contrast) of the television picture signal applied from the plate 10 of the video amplifier 9 to the intensity control element of the cathode-ray tube 19.

For synchronizing the operation of the sweep circuits, the output from the plate 10 is also applied through a resistor 20, a slow time constant circuit comprising a condenser 21 and a resistor 22, and a fast time constant circuit comprising resistor 23 and condenser 24 to the control grid 25 of a synchronizing signal suppressor tube 26. The cathode 27 of the tube 26 is grounded, while the plate 28 is connected to a B+ supply through a resistor 29. The output from the plate 28 is applied to conventional sync and sweep circuits 30 and then to the deflection circuits 31 of the cathode-ray tube 19 in the usual manner.

With the circuit described thus far, all signals, including noise received at the antenna and generated within the section 2, will appear at the output of the pentode video amplifier 9. If noise at the plate 10 of the video amplifier 9 reaches the sync and sweep circuits 30, there will be present in the picture a considerable amount of jitter and other interference, and loss of synchronization may even be caused. The noise inverter triode 32 is inserted in accordance with the teachings of the Anderson Patent No. 2,718,552 for the purpose of cancelling noise appearing across the resistor 20 and thereby preventing the noise from reaching the tube 26. The noise inverter triode 32 is provided with a plate 33 supplied with operating potential from the B+ supply through the resistors 15 and 20, a cathode 34 coupled for alternating currents to the plate 6 of the detector 4 through a condenser 35 and a control grid 36.

The system also includes a AGC detector 37 and an AGC amplifier 38 keyed in the usual manner. The AGC input signal is derived from the output of the intermediate frequency transformer 3, and the output is coupled to the various stages of the section 2 and to the control grid 36 of the noise inverter 32.

The bias on the grid 36 of the noise inverter 32 provided by the AGC amplifier is adjusted so that the noise inverter triode conducts only when the noise pulse signal level at the plate 6 of the video detector 4 exceeds the sync peak voltage of the video detector by a predetermined amount. When the noise inverter 32 conducts, it produces a negative polarity pulse across the sync separator input circuit, and this is out of phase with the positive noise pulses from the video amplifier 9. Since the noise signals are out of phase, they subtract so as to cancel, and thereby eliminate noise. In this way, conduction of the sync separator tube on impulse noise is prevented, and an improvement in signal-to-noise ratio is obtained for both horizontal and vertical synchronization.

However, the plate voltage on the noise inverter triode 32 varies with changes in setting of the contrast control resistor 18 and, therefore, the circuit as thus far described will function properly for only one setting of the video amplifier contrast control resistor 18. As previously noted, the voltage on the plate 33 of the noise inverter triode 32 is obtained from the B+ supply through the resistors 15 and 20. When the contrast control resistor 18 is varied, the voltage drop across the resistor 15 also varies, thus changing the voltage appearing at the plate 33 of the noise inverter 32. Some effort was made in the aforementioned Anderson patent to overcome this deficiency by employing an automatic gain control circuit at the plate of the noise inverter triode. However, the adverse effect on the noise inverter caused by varying the plate voltage is illustrated by the curves in Fig. 2.

The curves 39 and 40 in Fig. 2 represent the grid bias-versus-plate current characteristics of the noise inverter triode 32 at minimum contrast and maximum contrast, respectively. At minimum contrast control setting of the variable resistor 18, the conduction of the video amplifier tube 9 is low, and hence the voltage drop across the resistor 15 is small and the voltage on the plate 33 of the noise inverter triode 32 is high. Therefore, at the minimum contrast, the noise inverter triode 32 will cut off at the point A, and noise signals derived from the output of detector 4 will not be passed through the noise inverter triode 32 unless they exceed the amplitude of the applied signal represented by the curve 41 by more than an amout $x$. At maximum contrast control setting, the conduction of the video amplifier 9 is high, and hence the voltage drop across the resistor 15 is high and, therefore, the plate voltage on the noise inverter tube 32 is reduced, giving the cutoff characteristic shown at point B. Therefore, at maximum contrast, the noise inverter tube 32 will conduct noise signals only when the amplitude of the noise exceeds the applied signal by an amount $y$, and it may be readily observed that an extremely large amount of noise may reach the sync and sweep circuits before the noise inverter tube will begin to operate. Obviously, it is desirable to maintain the difference between the sync tips of the applied signals and the cutoff at a constant value $x$. In accordance with this invention, the resistors 42 and 43 have been provided for this purpose.

It can be seen from Fig. 1 that the resistors 42, 43 and 7 form a voltage divider between the plate 10 of the video amplifier, the plate 6 of the detector, and ground. It can also be seen that part of the bias between the cathode and grid of the noise inverter triode 32 is developed across the resistor 43 in the voltage divider network and, therefore, the bias is a function of the voltage at the plate of diode 4 and of the current flow through resistor 42. Since the flow of current through resistor 42 varies in proportion to the settings of the contrast control resistor 18, the bias on resistor 43 will also vary in proportion to settings of the contrast control. Therefore, the grid-cathode biasing potential of the noise inverter triode is adjusted in accordance with the change in voltage appearing at the plate 33, due to change in contrast, and the applied signal is effectively increased, as shown by the dotted curve 41$a$, to provide the same difference $x$ between the applied signal and the cutoff point B.

Since only a small percentage of the direct voltage on the plate 10 of the video amplifier 9 is fed back to the grid 13 of the video amplifier, satisfactory direct current restoration of the video signal is maintained.

It may be seen, therefore, that there has been provided an improved noise immunity circuit which will perform properly at all levels of operation of the contrast control and at all detector levels as determined by the response of the AGC system. Although this invention has been described with regard to a television receiver, this is merely illustrative, and it is to be understood that the described circuit may be used under any circumstances where it is desired to eliminate noise or other pulses, the magnitude of which exceeds a predetermined value. For example, in radar applications where the received pulses "ride" on noise signals, it is sometimes useful to cancel the received pulses and retain only the noise. Thus, in using the described circuit the bias on the grid of triode 32 would be adjusted so that the triode 32 will conduct only when the voltage on the cathode 34 exceeds the level of the noise by a predetermined amount.

Having thus described our invention, what is claimed is:

1. In a receiver, the combination comprising: a source of demodulated signals, said signals fortuitously containing noise; an amplifier for amplifying said demodulated signals, said amplifier having a first plate, a first cathode, and a first control grid, said demodulated signals being coupled across said first control grid and cathode; a direct current source connected across said first plate and cathode for operatively biasing said amplifier; means for cancelling noise appearing across said first plate and cathode, said means comprising a triode having a second plate, a second cathode, and a second control grid, said second cathode being connected through a first resistor to said first grid, said second plate being connected through a second resistor to said first plate; manual control means connected to said amplifier for adjusting the gain of said amplifier; a source of automatic gain control connected to said second control grid for biasing said second control grid to prevent conduction of said triode until the magnitude of said noise exceeds a predetermined level; and means in circuit with said amplifier and said triode, and responsive to the change of gain of said amplifier for automatically and instantaneously adjusting the voltage relationship between said second plate and said second cathode so as to maintain substantially constant the magnitude of noise required to cause conduction of said triode as the gain of said amplifier is varied.

2. The invention as defined in claim 1 wherein said last-named means comprises a third resistor connected between said first plate and said second cathode.

3. In a television receiver, the combination comprising: a source of intermediate frequency, said source comprising a carrier amplitude-modulated by a composite television signal having a synchronizing pulse component defined by peak carrier excursions of a fixed percentage of carrier modulation, said intermediate frequency source fortuitously including noise excursions exceeding the amplitude of said peak carrier excursions; a demodulator for demodulating said intermediate frequency signals; an amplifier for amplifying said demodulated intermediate frequency signals, said amplifier having first anode, cathode, and control electrodes, said demodulated intermediate frequency signals being coupled between said cathode and control electrodes; a direct current source connected across said first anode and cathode electrodes for operatively biasing said amplifier; manually adjustable means for varying the gain of said amplifier; a noise cancellation circuit comprising a triode having second anode, cathode, and control electrodes, said second anode electrode being connected to said first anode electrode through a first resistor, said second cathode electrode being connected to said first control electrode through a second resistor; automatic gain control means connected to said second control electrode for biasing said triode for conduction only when said noise exceeds said peak carrier excursions by a predetermined amount; and means including a third resistor connected between said first anode electrode and said second cathode electrode for automatically adjusting the conductivity of said triode as the gain of said amplifier is manually adjusted.

References Cited in the file of this patent

UNITED STATES PATENTS

| | | |
|---|---|---|
| 2,718,552 | Anderson | Sept. 20, 1955 |
| 2,752,431 | Goodrich | June 26, 1956 |
| 2,776,338 | Avins | Jan. 1, 1957 |
| 2,803,700 | Kroger | Aug. 20, 1957 |
| 2,845,487 | Massman | July 29, 1958 |

FOREIGN PATENTS

| | | |
|---|---|---|
| 741,572 | Great Britain | Dec. 7, 1955 |